(No Model.)

J. P. McPHERSON.
FILTER.

No. 254,491. Patented Mar. 7, 1882.

Witnesses.
Arthur F. C. Prinkert
B. J. Noyes

Inventor
John P. McPherson
by Crosby & Gregory
Attys

UNITED STATES PATENT OFFICE.

JOHN P. McPHERSON, OF BOSTON, MASSACHUSETTS.

FILTER.

SPECIFICATION forming part of Letters Patent No. 254,491, dated March 7, 1882.

Application filed January 3, 1882. (No model.)

*To all whom it may concern:*

Be it known that I, JOHN P. MCPHERSON, of Boston, county of Suffolk, State of Massachusetts, have invented an Improvement in Filters, of which the following description, in connection with the accompanying drawings, is a specification.

My invention relates to filters of that class known as "reversible filters," in which a receptacle containing filtering material and passages for the water to enter and pass out after having passed through the said material is arranged to have its position reversed with relation to the flow of water, so that what has been the inlet-passage will become the outlet-passage, and the sedimentary material which has collected at the mouth of the passage when an inlet will be carried off therefrom as an outlet, and the filter will thus be cleansed. The said filtering-receptacle is mounted in a case having fixed inlet and outlet passages, the said filtering-receptacle being rotated on an axis transverse to the flow of water through the said case to reverse its position relative to the said flow, as just described.

In order that all the water shall flow through the receptacle, it is necessary to close the space between the outside of the filtering-receptacle and the inside of its case by some suitable packing, which shall not, however, interfere with the rotation of the said receptacle. This is accomplished in accordance with this invention by the employment of an independent packing-ring having a circumferential packed bearing in a cylindrical portion of the case, in which it may have a slight reciprocating movement.

The filtering-receptacle is provided with plane surfaces, surrounding its inlet and outlet passages, and the said packing-ring has a plane surface adapted to fit tightly thereon to prevent flow of water between the said ring and the receptacle. The packing-ring is operated by a suitable handle and connecting mechanism to press it tightly upon the plane portion of the filtering-receptacle, which thus forms a seat therefor, and it may be raised by the said handle up from the said receptacle a sufficient distance to permit the rotation thereof. The said ring, being tightly packed within the casing, will, when tightly seated upon the filtering-receptacle, completely intercept the flow of the water between the said casing and receptacle, and when raised from its seat will afford a free passage to the water between the said casing and receptacle, as is sometimes desirable when a rapid flow of water is desired without filtering.

Figure 1:
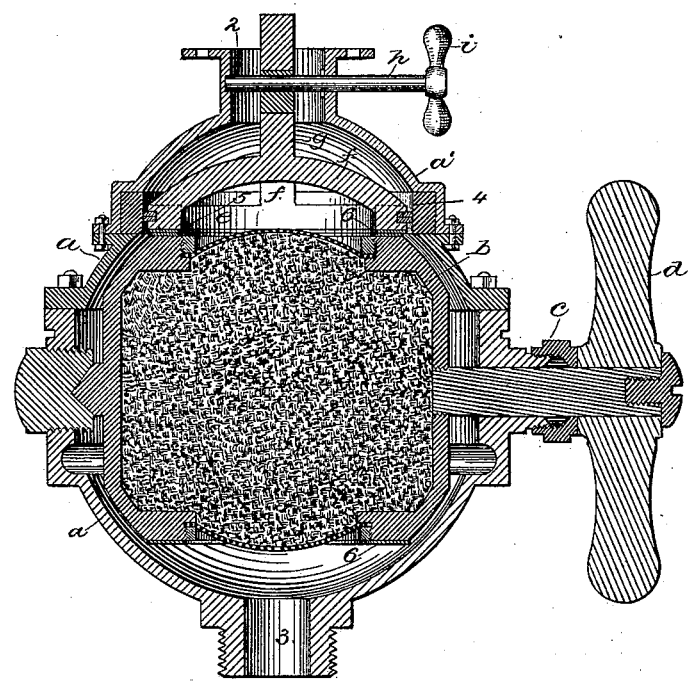
Figure 2:
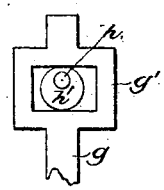
Figure 3:
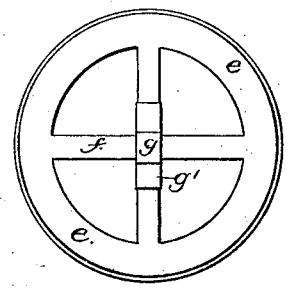

Figure 1 shows in section a filter constructed in accordance with this invention. Fig. 2 is a detail, showing the mechanism for operating the packing-ring; Fig. 3, a plan view of the said packing-ring.

The outer casing, $a$, provided with inlet and outlet passages 2 3, contains the filtering-receptacle $b$, mounted on an axis transverse to the flow of water between the said passages, and provided with an operating-stem, $c$, extending outside the said case and having a handle, $d$, thereon, may be of any usual construction. The upper portion of the said casing $a$, containing the inlet-passage 2, is shown as an independent bonnet, $a'$, containing an internal cylindrical surface, 4, in which the packing-ring $e$ is fitted to move longitudinally, the said ring being provided with suitable packing to prevent the flow of water between it and the cylindrical surface 4. The under surface, 5, of the said ring is made plane, and the packing-receptacle $b$ is provided with plane surfaces 6, which serve as a seat for the said packing-ring, suitable washers being interposed to prevent any flow of water between the said ring and receptacle when pressed together, as shown in Fig. 1. When the ring $e$ is thus seated upon the filtering-receptacle, as shown in Fig. 1, it forms a water-tight barrier between the said receptacle and its casing $a$, so that the water or other fluid entering the inlet-passage 2 of the casing will be compelled to pass through the filtering material in the receptacle $b$ before reaching the outlet-passage 3.

When desired to reverse or invert the receptacle $b$ to cause the water to flow through it in the opposite direction, the packing-ring $e$ will be raised from its seat upon the said receptacle sufficiently to permit the latter to be rotated by its handle $d$. The said packing-ring is provided with spider-arms $f$ and a stem, $g$, adapted to be operated by a rod, $h$, and handle $i$. As herein shown the stem $g$ is provided with a yoke, $g'$, (see Fig. 3,) and the stem $h$ has an eccentric, $h'$, within the said yoke, so that when it is rotated by the handle $i$ the ring $e$ will be raised and depressed.

It is obvious that the stem $g$ might be provided with a rack and the rod $h$ with a pinion, or other means might be employed to operate the packing-ring $e$ from the outside of the case $a$, the exact mechanism shown not being essential. When the ring $e$ is raised from its seat 6 the water has a free passage between it and the filtering-receptacle, and thence around the outside of the said receptacle between it and the case $a$, thus forming a free way for the liquid when it is not desired to filter it. It will be seen that the only portions of the receptacle $b$ that require finishing are the surfaces 6, thus making its construction much cheaper than when the receptacle itself serves as a valve, and has to have its entire surface finished to fit properly in a seat or washer in the casing.

The case $a$ might have an internal seat in line with the seat 6 on the receptacle $b$ and the ring $e$ come to a bearing on both simultaneously, instead of having the cylindrical bearing in the casing, its function and operation being otherwise the same.

I claim—

1. In a filter, the combination, with the external case and filtering-receptacle therein, of the independent movable packing-ring having a tight fit on a portion of the inner surface of the said case and outer surface of the said receptacle, substantially as and for the purpose described.

2. The external case and filtering-receptacle therein, provided with a plane seat, combined with the independent packing-ring, having a tight fit on a portion of the inner surface of the said case and being movable toward and from the said seat, whereby it can obstruct the flow of water between the said case and receptacle or not, substantially as and for the purpose set forth.

3. The case provided with inlet and outlet passages and an internal cylindrical portion and the filtering receptacle mounted to rotate therein and provided with plane seat portions, combined with the packing-ring having a circumferential tight bearing in the cylindrical portion of the case, and means to move it longitudinally therein onto or off from the said seat portions of the filtering-receptacle, substantially as described.

In testimony whereof I have signed my name to this specification in the presence of two subscribing witnesses.

JOHN P. McPHERSON.

Witnesses:
JOS. P. LIVERMORE,
B. J. NOYES.